United States Patent
Tashima et al.

[11] Patent Number: 5,966,178
[45] Date of Patent: Oct. 12, 1999

[54] IMAGE PROCESSING APPARATUS WITH INTERFRAME INTERPOLATION CAPABILITIES

[75] Inventors: Hirotaka Tashima; Takafumi Edanami, both of Kawasaki, Japan

[73] Assignee: Fujitsu Limited, Kanagawa, Japan

[21] Appl. No.: 08/964,745

[22] Filed: Nov. 5, 1997

[30] Foreign Application Priority Data

Jun. 5, 1997 [JP] Japan ............................... 9-147405

[51] Int. Cl.[6] .................................................. H04N 7/30
[52] U.S. Cl. ............................................ 348/403; 382/248
[58] Field of Search ................................. 348/384, 390, 348/403, 404, 407, 409, 415, 416; 382/232, 236, 238, 248, 249

[56] References Cited

U.S. PATENT DOCUMENTS 5,748,789   5/1998   Lee ........................................... 382/243

FOREIGN PATENT DOCUMENTS

| | | |
|---|---|---|
| 60-241387 | 11/1985 | Japan . |
| 1-48181 | 2/1989 | Japan . |
| 3-109677 | 5/1991 | Japan . |
| 3-132467 | 6/1991 | Japan . |
| 4-60880 | 2/1992 | Japan . |
| 4-246788 | 9/1992 | Japan . |
| 4-256078 | 9/1992 | Japan . |
| 7-050825 | 2/1995 | Japan . |
| 7-073388 | 3/1995 | Japan . |
| 7-287781 | 10/1995 | Japan . |
| 8-54667 | 2/1996 | Japan . |

*Primary Examiner*—Bryan Tung
*Attorney, Agent, or Firm*—Helfgott & Karas, P.C.

[57] ABSTRACT

An image processing apparatus with interframe interpolation capabilities for reproducing a sequence of video frames by performing a frame interpolation between two given video frame images to compensate for dropped frames. The image processing system comprises an outline detection unit to detect the outline of each moving object contained in a frame image and an affine parameter calculation unit to calculate first affine parameters based on the geometrical relationship between one outline image at a first point in time and another outline image at a second point in time. Based on the first affine parameters, an affine parameter interpolation unit performs a linear interpolation to produce second affine parameters corresponding to a third point in time between the first and second points in time. An interpolated image generation unit then applies an affine transformation to the object images at the first or second point in time, using the second affine parameters supplied from the affine parameter interpolation unit, thereby generating another frame image of each moving object at the third point in time.

5 Claims, 10 Drawing Sheets

AT TIME POINT (tn)

FIG. 10(B) PRIOR ART

AT TIME POINT (tn+1)

IMAGE PROCESSING APPARATUS WITH INTERFRAME INTERPOLATION CAPABILITIES

BACKGROUND OF THE INVENTION

1. Field of the Invention

The present invention relates to an image processing apparatus with interframe interpolation capabilities, and more particularly, to an image processing apparatus which reproduces a smooth sequence of frames by applying an interframe interpolation to video images with some frame dropped.

2. Description of the Related Art

Some video communications systems, such as videoconferencing systems, are designed to use ordinary low-speed telecommunication lines to deliver image information to the receiving ends. In such systems, the frame rate (i.e., the number of frames transmitted in a unit time) is dynamically controlled in accordance with the amount of information to be actually delivered. More specifically, when the source pictures contained a large amount of video information, some frames may be dropped at the sending end to reduce the information transmitted over the communications channel. This frame subsampling operation, however, can degrade smoothness of the pictures reproduced at the receiving ends; it makes rapid movements of on-screen objects appear jerky. The present invention is addressed to the solution of such problems.

Japanese Patent Application Laid-open Publication No. 3-109677 (1991), for example, discloses an image processor with interframe interpolation capabilities. This conventional image processor produces a smooth and continuous succession of video images from time-discrete source pictures sampled at certain time intervals, which feature allows the processor to be used to create animation from a limited number of key-frames or to display images captured by ultrasound imaging devices for medical treatment.

Figure 9:
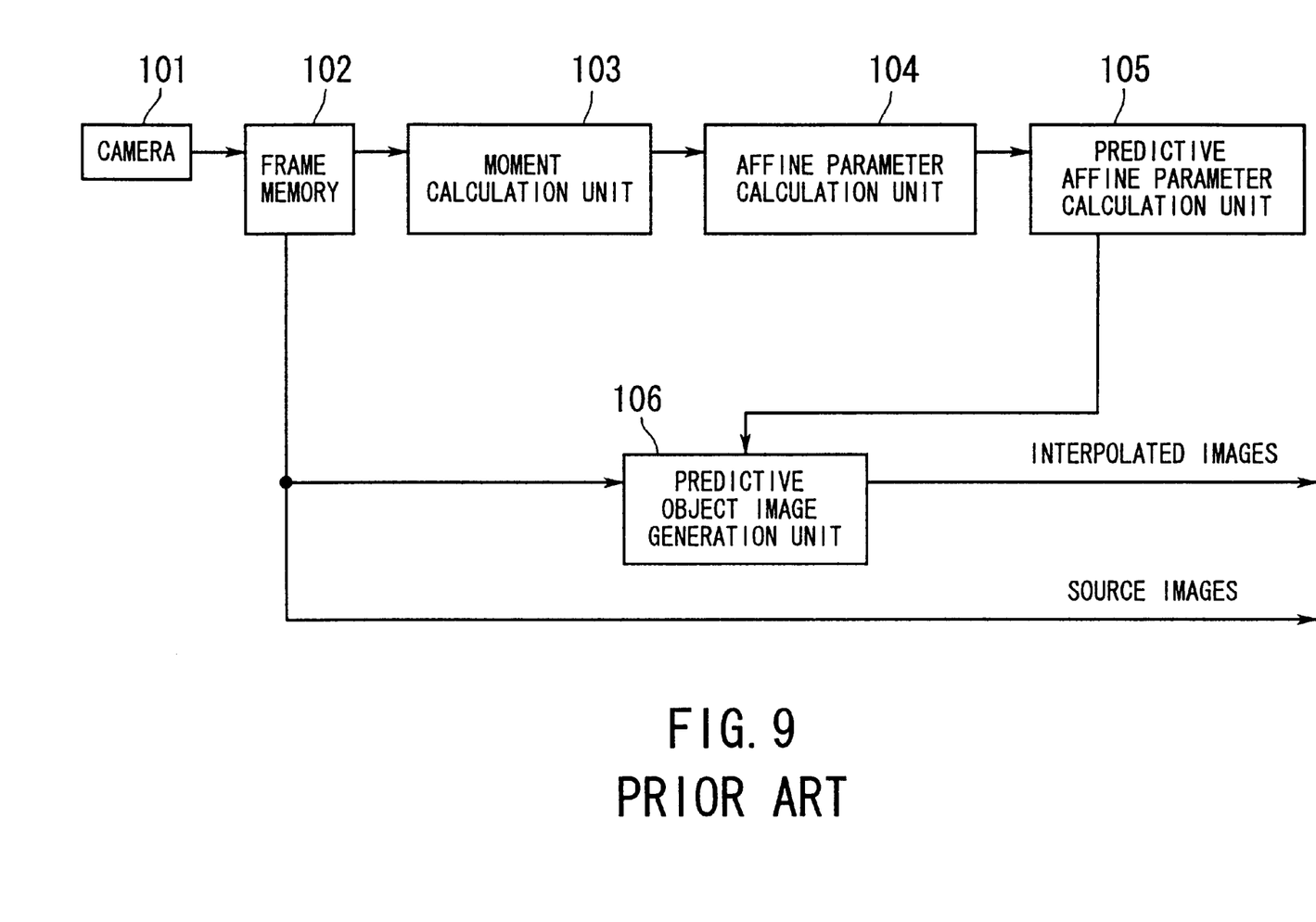
FIG. 9 is a diagram which shows a configuration of a conventional image processor with interframe interpolation capabilities.
Figure 10A:
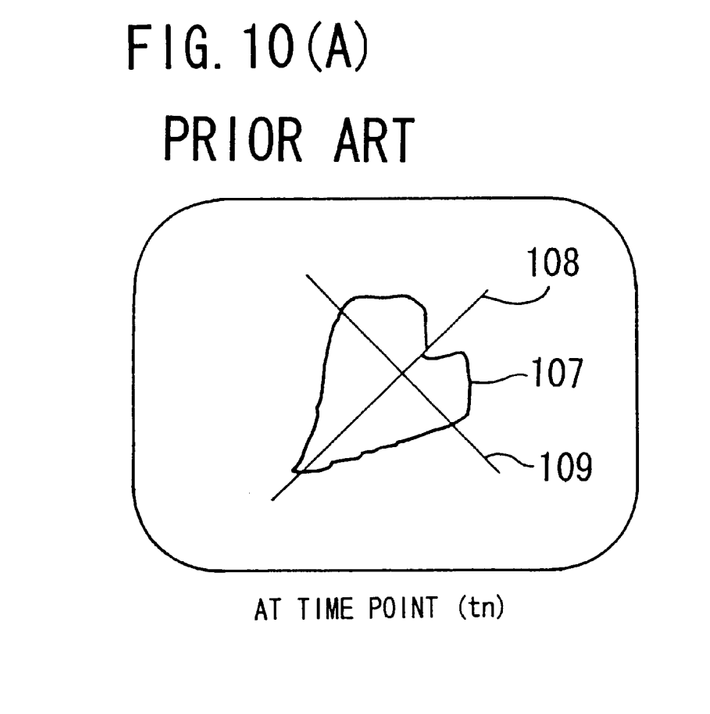
FIG. 10(A) is a diagram which shows a frame image at time point (tn)
Figure 10B:
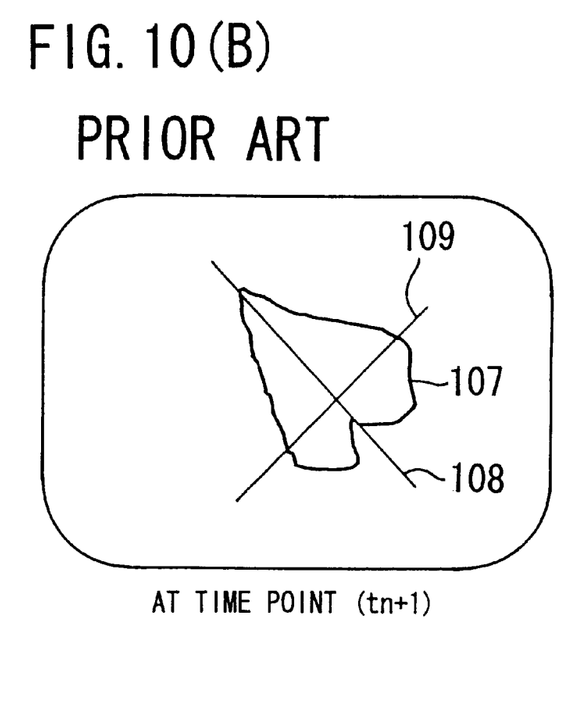
FIG. 10(B) is a diagram which shows a frame image at time point (tn+1).

FIG. 9 shows a typical configuration of such a conventional image processor with frame interpolation functions. Specifically, source frame images captured by a camera 101 are stored into a frame memory 102, frame by frame. The frame memory 102 supplies a moment calculation unit 103 with two consecutive frame images captured at discrete points in time, (tn) and (tn+1), as illustrated in FIGS. 10(A) and 10(B). In each frame image provided, the moment calculation unit 103 recognizes a moving object 107 by approximation to an ellipse, and calculates its first-order moment axis 108 and second-order moment axis 109. Next, an affine parameter calculation unit 104 calculates affine parameters (or coefficients for affine transformation) through evaluation of geometrical relation between the first-order and second-order moment axes 108 and 109 at time point (tn) and those at time point (tn+1).

Based on the affine parameters calculated above, a predictive affine parameter calculation unit 105 calculates another set of affine parameters for an intermediate time point (tn+t) between the two time points (tn) and (tn+1); i.e., tn<tn+t<tn+1. The obtained affine parameters are then supplied to a predictive object image generation unit 106. With the affine parameters for time point (tn+t), the predictive object image generation unit 106 conducts an affine transformation to the image of the moving object 107 included in the source frame image at time point (tn) or (tn+1) sent from the frame memory 102, thereby generating an in-between frame image at time point (tn+t).

As described above, the conventional image processor of FIG. 9 calculates the first-order moment axis 108 and second-order moment axis 109 to determine the object's orientation. That algorithm, however, consumes a large amount of computing power to perform two-dimensional sum-of-products operations over the entire image of each moving object. This leads to a difficulty in obtaining frame-interpolated video images in a real-time fashion. As mentioned earlier, such conventional image processors can be used to create animation or to display images captured by ultrasound imaging devices for medical purposes. However, it should be noticed here that these are all off-line, or non-real-time, applications. Conversely, the conventional image processors with interframe interpolation capabilities can not be applied to, for example, videoconferencing systems where real-time image processing is essential.

Meanwhile, the rotation angle of the moving object 107 is one of the affine parameters that must be identified. The conventional image processors calculate this parameter from the first-order moment axis 108 and second-order moment axis 109 at two points in time (tn) and (tn+1). But here lies another problem with the conventional algorithms that the range of rotation angles that can be correctly identified is limited to 90 degrees at most.

More specifically, consider that the first-order moment axis 108 at time point (tn) and the same at time point (tn+1) form an angle $\alpha$, where $0<\alpha\leq 90$ [degrees]. Although this condition can actually happen when the object has rotated by just $\alpha$ degrees or $(180-\alpha)$ degrees, the conventional image processing algorithms are unable to discriminate whether the true rotation angle was $\alpha$ degrees or $(180-\alpha)$ degrees because of the symmetrical nature of the elliptic approximation models that they use. In practice, the conventional image processors are designed not to interpret it as $(180-\alpha)$ degrees, but take $\alpha$ degrees as the rotation angle in such a situation. That is, they cannot identify the affine parameters correctly when the actual rotation of an object exceeds 90 degrees.

SUMMARY OF THE INVENTION

Taking the above into consideration, an object of the present invention is to provide an image processing apparatus with interframe interpolation capabilities which realizes real-time generation of frame-interpolated images.

Another object of the present invention is to provide an image processing apparatus with interframe interpolation capabilities which provides a wider detection range of rotation angles of moving objects.

To accomplish the above objects, according to the present invention, there is provided an image processing apparatus with interframe interpolation capabilities for reproducing video frames by performing a frame interpolation between given video frame images. This image processing apparatus comprises an outline detection unit, an affine parameter calculation unit, an affine parameter interpolation unit, and an interpolated image generation unit as described below.

The outline detection unit calculates interframe difference values and intraframe difference values with respect to a plurality of video frame images supplied in a time sequence. It then detects the outlines of individual object images based on the interframe difference values and the intraframe difference values. Here, the plurality of video frame images include a first frame image at a first point in time and a second frame image at a second point in time. The first frame image contains a first object image, while the second frame image contains a second object image. The outlines detected by the outline detection unit include a first outline of the first object image and a second outline of the second object image.

The affine parameter calculation unit calculates first affine parameters that represent a geometric transformation between the first outline and the second outline detected by the outline detection unit. By performing a linear interpolation with respect to the first affine parameters calculated by the affine parameter calculation unit, the affine parameter interpolation unit produces second affine parameters corresponding to a third point in time between the first point in time and the second point in time. With those second affine parameters corresponding to the third point in time, the interpolated image generation unit generates an in-between object image at the third point in time by applying an affine transformation to the first object image at the first point in time or, alternatively, to the second object image at the second point in time.

The above and other objects, features and advantages of the present invention will become apparent from the following description when taken in conjunction with the accompanying drawings which illustrate a preferred embodiment of the present invention by way of example.

DESCRIPTION OF THE PREFERRED EMBODIMENTS

An embodiment of the present invention will be described below with reference to the accompanying drawings.

Figure 1:
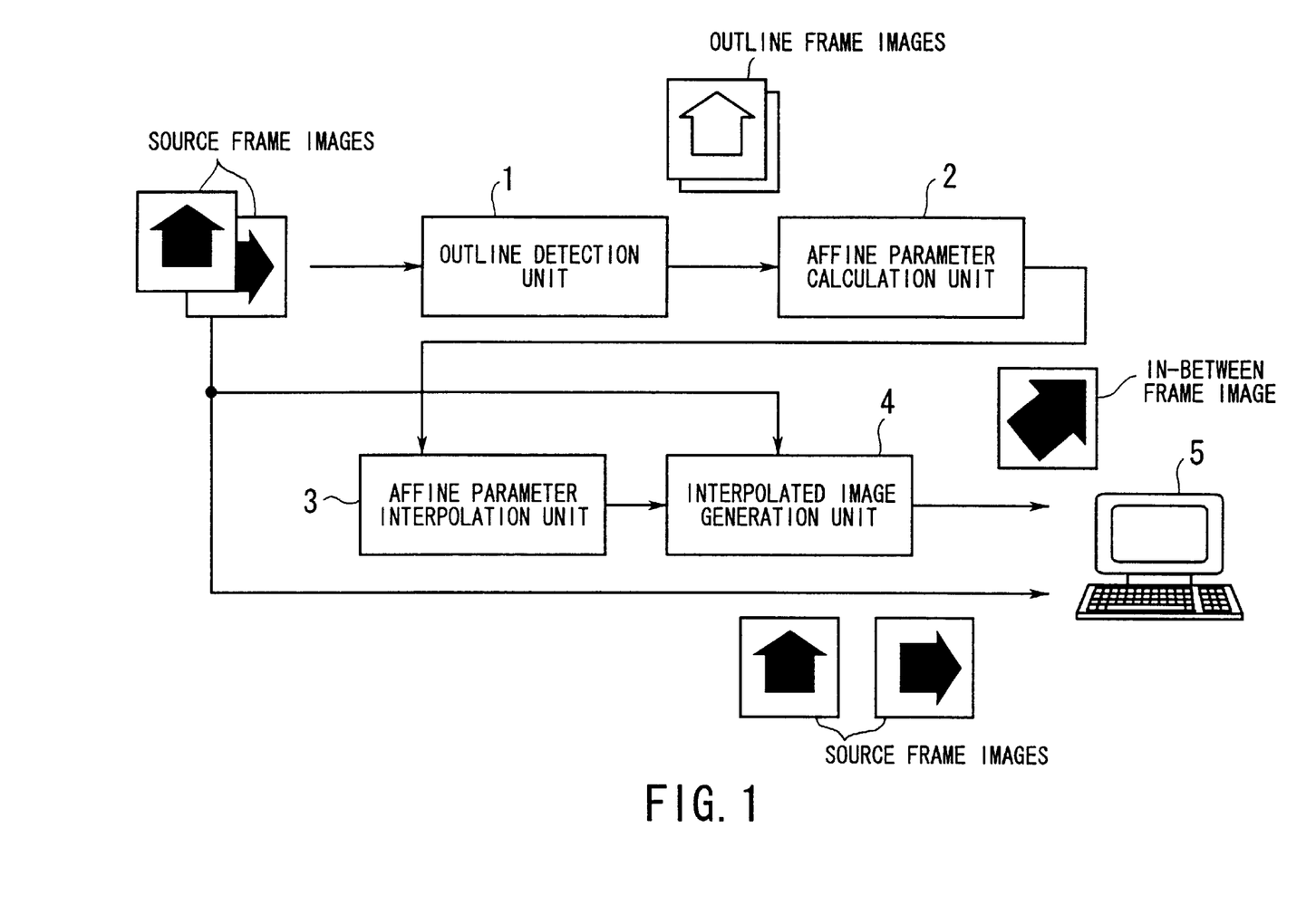
FIG. 1 is a conceptual view of the present invention.

Referring first to FIG. 1, the concept of the present invention will now be explained. According to the preferred embodiment of the present invention, an image processor with interframe interpolation capabilities comprises the following elements:

(a) Outline detection unit 1 to calculate interframe difference values and intraframe difference values with respect to a plurality of video frame images supplied in a time sequence, and to detect outlines of individual object images based on the interframe difference values and the intraframe difference values. Here, the plurality of video frame images include a first frame image at a first point in time and a second frame image at a second point in time. The first frame image contains a first object image, while the second frame image contains a second object image. The outlines detected by the outline detection unit 1 include a first outline of the first object image and a second outline of the second object image.

(b) Affine parameter calculation unit 2 to calculate first affine parameters that represent a geometric transformation between the first outline and the second outline which are detected by the outline detection unit 1.

(c) Affine parameter interpolation unit 3 to produce second affine parameters corresponding to a third point in time between the first point in time and the second point in time, by performing a linear interpolation with respect to the first affine parameters calculated by the affine parameter calculation unit 2.

(d) Interpolated image generation unit 4 to generate an in-between object image at the third point in time by applying an affine transformation to the first object image at the first point in time or to the second object image at the second point in time, with the second affine parameters corresponding to the third point in time.

In the above system configuration, the outline detection unit 1 first calculates interframe and intraframe differences of video frames that are sequentially entered to the system. It then detects the outlines of moving objects based on the interframe and intraframe differences. Specifically, the outline detection unit 1 examines the interframe and intraframe difference images and recognizes their overlapping part, if any, as the outline of a moving object.

Then, based on the outline images detected by the outline detection unit 1 in the individual frames, the affine parameter calculation unit 2 calculates first affine parameters that represent a geometric transformation from one outline image of a moving object at a first point in time to another outline image of the same object at a second point in time.

Based on the first affine parameters calculated by the affine parameter calculation unit 2, the affine parameter interpolation unit 3 performs a linear interpolation to obtain another set of affine parameters corresponding to a third point in time between the first and second points in time. The interpolated image generation unit 4 applies an affine transformation to the image of the moving object at the first or second point in time, based on the interpolated affine parameters, or the second affine parameters, corresponding to the third point in time, thereby generating another image of the moving object. This in-between image at the third point in time is inserted between the other two frames, and a video display unit 5 sequentially displays those three frame images in the temporal order (i.e., the first, third, and then second, in this case).

As described above, the present invention comprises the outline detection unit 1 and affine parameter calculation unit 2 to obtain the outlines of moving objects in each frame and calculate affine parameters from the geometrical relation between the obtained outlines. Calculation of such object outlines and affine parameters requires a far smaller amount of computation power, compared to the aforementioned conventional methods which calculate moment axes to obtain affine parameters. This advantage comes from the fact that the calculation proposed in the present invention is one-dimensional, as opposed to the two-dimensional calculations that must be executed in the conventional methods. The reduction of computation loads permits the video images to be processed in a real-time fashion, and thus the image processor of the present invention can serve for videoconferencing systems and other time-sensitive applications.

Furthermore, since the image processor of the present invention calculates affine parameters from the outline of a moving object, it is possible to detect the rotation of the moving object up to 180 degrees without problem. This expanded range of detectable rotation angles is two times as wide as that in the conventional moment-axis-based methods.

The next section will clarify the embodiment of the present invention in further detail.

Figure 2:
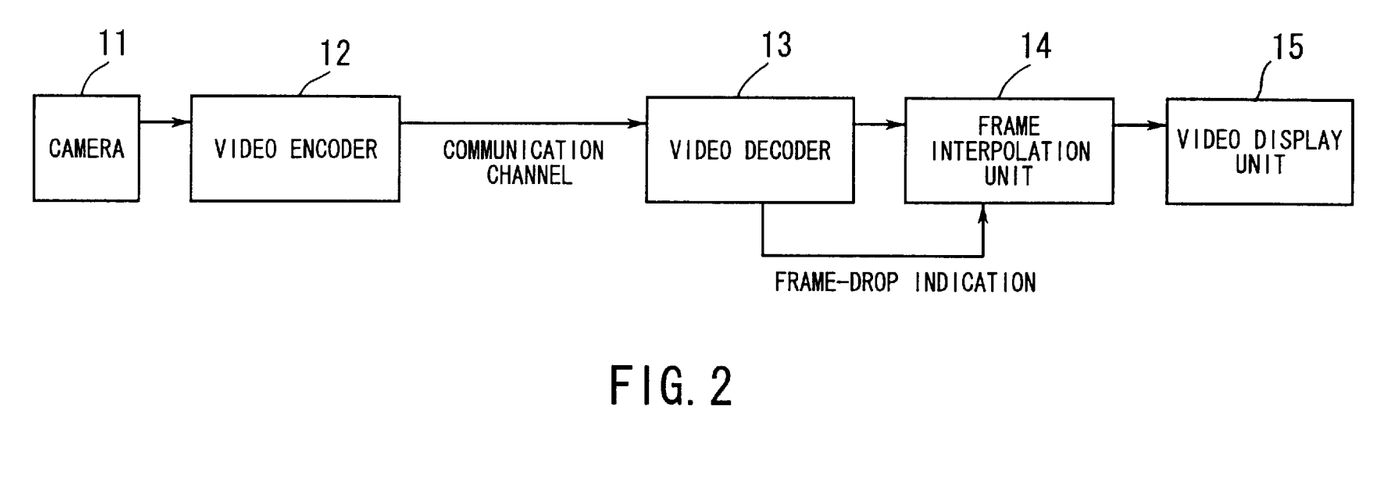
FIG. 2 is a diagram which shows the total structure of a videoconferencing system that comprises an image processor with interframe interpolation capabilities according to the present invention.

FIG. 2 shows the total structure of a video-conferencing system incorporating an image processor with interframe interpolation capabilities according to the present invention. More specifically, a camera 11 at the sending end supplies a video encoder 12 with source frame images in the NTSC format, and the video encoder 12 encodes the sequence of images to transmit the video information over a communication channel in compressed form. Besides applying several image compression techniques, the video encoder 12 intentionally drops some frames if the volume of the video information cannot be sufficiently reduced by the image compression alone. As a result of such frame subsampling operations, the frame transmission rate may be decreased to, say, 10 frames per second (fps), which is much slower than the standard rate of 30 fps.

At the receiving end, a video decoder 13 decodes the encoded video information to reconstruct the original sequence of video frames. Although the video information may indicate some frame drops, the decoding process does not reproduce the frames lost in the subsampling process. Instead, a frame interpolation unit 14 is responsible for restoration of such lost frames with some estimation techniques, thus allowing a video display unit 15 to show the video at the standard frame rate of 30 fps.

The frame interpolation unit 14 applies an affine transformation to the decoded images of a moving object. An affine transformation expresses geometrical relationship between moving object images in two consecutive frames in the time series, which is defined as a combination of parallel translation, scaling (i.e., expansion and reduction in image size), and rotation operations. More specifically, consider that P(x,y,tn) denotes individual pixel values of a frame image at time point (tn), and P(X,Y,tn+1) represents individual pixel values of the next frame image at time point (tn+1). Here is an equation established for transformation of a moving object image from one frame to another.

$$\begin{pmatrix} X \\ Y \end{pmatrix} = C \begin{pmatrix} \cos \Delta\theta & -\sin \Delta\theta \\ \sin \Delta\theta & \cos \Delta\theta \end{pmatrix} \begin{pmatrix} x \\ y \end{pmatrix} + \begin{pmatrix} A \\ B \end{pmatrix}, \qquad (1)$$

where C is scaling factor, $\Delta\theta$ is rotation angle, and A and B are parallel displacement values in the X-axis and Y-axis directions, respectively. This transformation is a two-dimensional affine transformation, and the parameters C, $\Delta\theta$, A, and B in Equation (1) are called affine parameters. The frame interpolation unit 14 estimates a dropped frame with this Equation (1).

Figure 3:
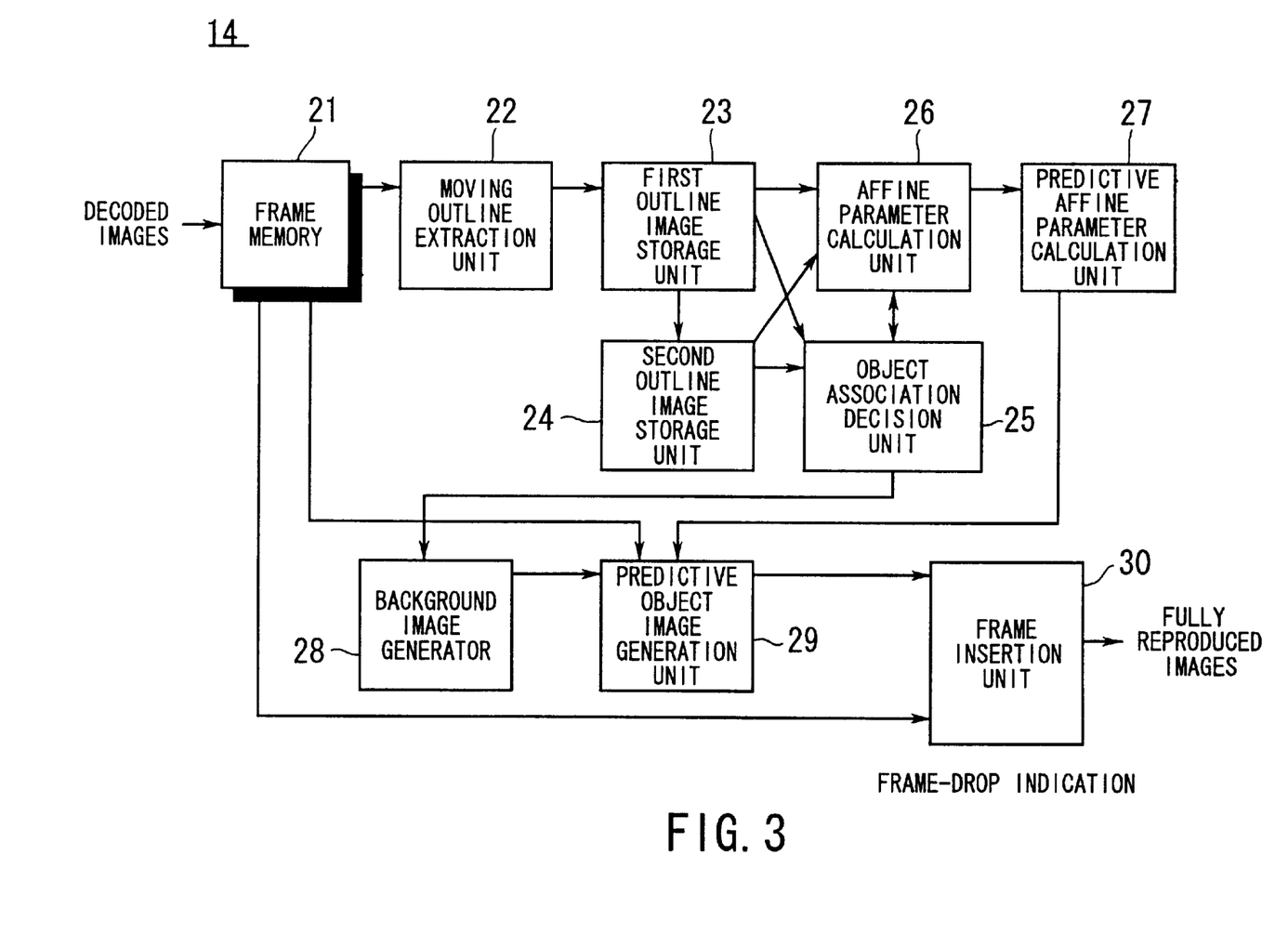
FIG. 3 is a diagram which shows the internal structure of a frame interpolation unit.

FIG. 3 shows the internal structure of the frame interpolation unit 14. In FIG. 3, a time sequence of decoded frame images is supplied to a frame memory 21 for storage. Note that this time sequence provided to the frame memory 21 may be a continuous series of non-subsampled, 30 fps frames, or may otherwise be a discontinuous series of frames that are subsampled.

From the frame memory 21, a moving outline extraction unit 22 reads out the present frame image F(x,y,tn) at time point (tn) and the preceding frame image F(x,y,tn−1) at time point (tn−1) to extract the outlines of a moving object. To this end, the moving outline extraction unit 22 first calculates interframe difference Fd according to the following equation (2).

$$Fd(x,y) = |F(x,y,tn) - F(x,y,tn-1)| \qquad (2)$$

The moving outline extraction unit 22 further calculates intraframe difference Fi for the present frame image F(x,y,tn) at time point (tn), based on the following equation (3).

$$Fi(x,y) = abs(lap(F(x,y,tn))), \qquad (3)$$

where abs represents a function to obtain an absolute value of its argument, and lap represents a Laplacian operator.

The moving outline extraction unit 22 yields an outline frame image E(x,y,tn) from those interframe difference Fd(x,y) and intraframe difference Fi(x,y), based on the following equation (4).

$$E(x, y, t_n) = 1 \text{ (if } Fd(x, y) + Fi(x, y) > th), \qquad (4)$$
$$= 0 \text{ (if } Fd(x, y) + Fi(x, y) \leq th)$$

This Equation (4) evaluates the frame of interest as follows. If the sum Fd(x,y)+Fi(x,y) at a pixel position (x,y) is greater than a threshold th, a value "1" is given to a corresponding pixel of the outline frame image E(x,y,tn). If it is not greater than the threshold th, a value "0" is given to that pixel. The outline frame image E(x,y,tn) produced as such is a binary image.

The outline frame image E(x,y,tn) obtained as above is then saved into a first outline image storage unit 23. After that, when the next outline frame image E(x,y, tn+1) has arrived at the next time point (tn+1), the first outline image storage unit 23 transfers the previous outline frame image E(x,y,tn) to a second outline image storage unit 24 and, instead, saves the new outline frame image E(x,y,tn+1).

When there exist a plurality of moving objects within those two consecutive outline images E(x,y,tn) and E(x,y,tn+1) an object association decision unit 25 associates each object found in one outline image with its counterpart in another outline image. More specifically, the object association decision unit 25 identifies a plurality of moving objects existing in the first outline frame image E(x,y,tn), and names them m1, m2, m3, and so on.

Likewise, it also identifies a plurality of object images existing in the second outline frame image E(x,y,tn+1), and then names them n1, n2, n3, and so on. The object association decision unit 25 then creates all possible combinations of two object images, selecting from among [m1, m2, m3, . . . ] and [n1, n2, n3, . . . ]. The resultant combinations will include the following object image pairs:

[m1, n1];  [m1, n2];  [m1, n3]; ...
[m2, n1];  [m2, n2];  [m2, n3]; ...
[m3, n1];  [m3, n2];  [m3, n3]; ...
...

Cooperating with an affine parameter calculation unit 26 as will be described later on, the object association decision unit 25 examines each combination to evaluate the similarity between an object image in the first outline frame image E(x,y,tn) and another object image in the second outline frame image E(x,y,tn+1). Take a combination [m1, n1] for instance. The object association decision unit 25 evaluates the similarity between the object image m1 in the first outline frame image E(x,y,tn) and the object image n1 in the second outline frame image E(x,y,tn+1). The following section will describe how the object association decision unit 25 operates.

Exploring the outline frame images E(x,y,tn) and E(x,y,tn+1), the affine parameter calculation unit 26 first identifies two object images in a specific combination that has been specified by the object association decision unit 25. For illustrative purposes, it is assumed here that the combination of object images m1 and n1 has been specified. Note that what are referred to as the object images m1 and n1 in this section are binary images representing the outlines of moving objects. The affine parameter calculation unit 26 then calculates the center of gravity g1 of the object image m1, which is identified as part of the outline frame image E(x,y,tn). It further calculates the center of gravity g2 of the object image n1 in the outline frame image E(x,y,tn+1).

Next, the affine parameter calculation unit 26 provides a polar coordinate representation of the object images. More specifically, any point lying on the outline of the object image m1 can be represented by coordinates (r,θ), where θ is the angle between a certain reference axis and the ray from the center of gravity g1 to the point, and r is the length of that ray. The affine parameter calculation unit 26 calculates such polar coordinates (r,θ) of every pixel of the object image m1, as well as those of the other object image n1.

Figure 4A:
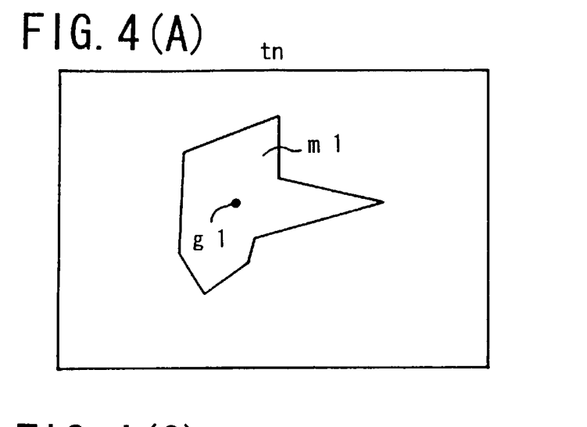
FIG. 4(A) is a diagram which shows the outline image and the center of gravity g1 of an object image m1 seen in an outline frame image E(x,y,tn)
Figure 4B:
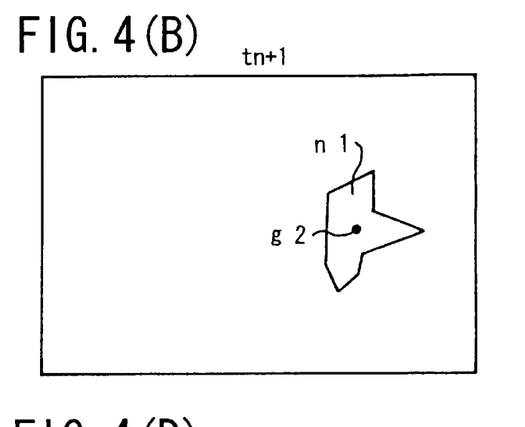
FIG. 4(B) is a diagram which shows the outline image and the center of gravity g2 of an object image n1 seen in an outline frame image E(x,y,tn+1).
Figure 4C:
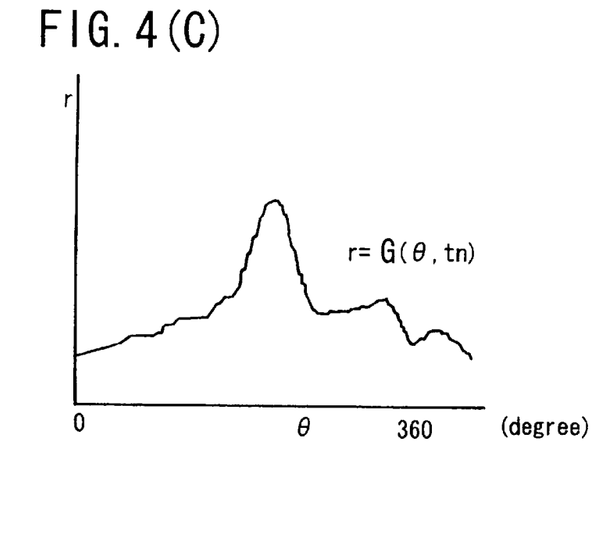
FIG. 4(C) is a plot of distance r versus angle θ of the outline image shown in FIG. 4(A)
Figure 4D:
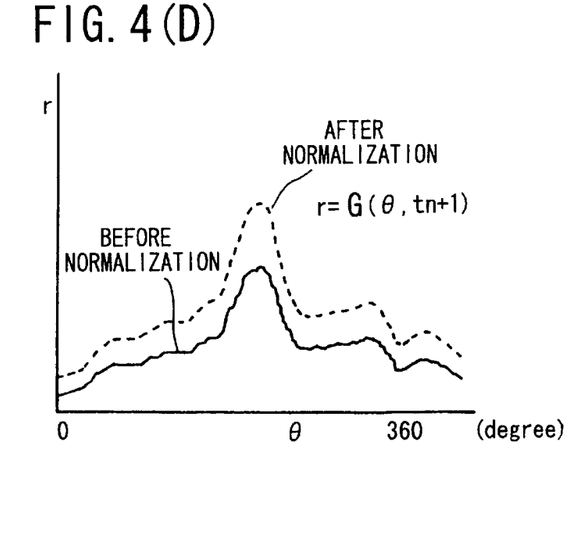
FIG. 4(D) is a plot of distance r versus angle θ of the outline image shown in FIG. 4(B)

FIGS. 4(A) to 4(D) illustrate how the outline, center of gravity, distance r, and angle θ are associated with one another. More specifically, FIG. 4(A) shows the outline and the center of gravity g1 of the object image m1 as part of the first outline frame image E(x,y,tn). Likewise, FIG. 4(B) shows the outline and the center of gravity g2 of the object image n1 found in an outline frame image E(x,y,tn+1). FIG. 4(C) presents a plot of distance r versus angle θ (hereafter, this is called "r–θ plot") of the object image m1 shown in FIG. 4 (A), while FIG. 4(D) shows an r–θ plot of the object image n1 shown in FIG. 4(B).

For each of the object images n1 and m1, the affine parameter calculation unit 26 calculates the average of distance values r over the entire range (i.e., 0 to 360 degrees) of angle θ, and it then normalizes those distance values r based on the average. In other words, the distance values r are magnified or reduced in accordance with their average value so that the two r–θ plots will exhibit no substantial difference in size, as indicated by the broken line in FIG. 4(D). Here, the normalized r–θ plot in FIG. 4(C) is expressed as r=G(θ,tn), while the normalized r–θ plot in FIG. 4(D) is expressed as r=G(θ,tn+1).

Next, the affine parameter calculation unit 26 calculates the degree of difference, or difference level D(Δθ), based on the following expression (5).

$$D(\Delta\theta) = \int_{\theta=0}^{2\pi} |G(\theta, n) - G(\theta + \Delta\theta, n+1)| d\theta, \quad (5)$$

where G(θ+Δθ,tn+1) represents an r–θ plot obtained by slightly shifting the original plot r=G(θ,tn+1) by an angle Δθ.

The affine parameter calculation unit 26 then finds a particular value of Δθ that minimizes the difference level D(Δθ), as well as obtaining the minimum difference level Dmin at that particular Δθ, as expressed by $$Dmin=min(D(\Delta\theta)). \quad (6)$$

Figure 5A:
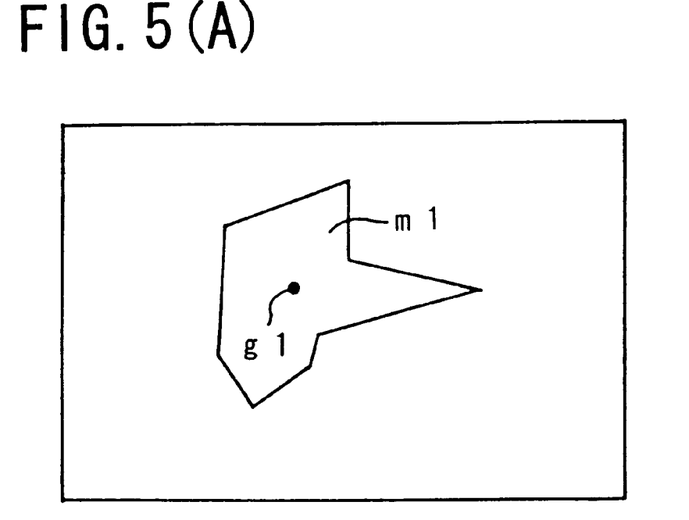
FIG. 5(A) is a diagram which shows the outline image and the center of gravity g1 of a normalized object image m1 in an outline frame image E(x,y,tn)
Figure 5B:
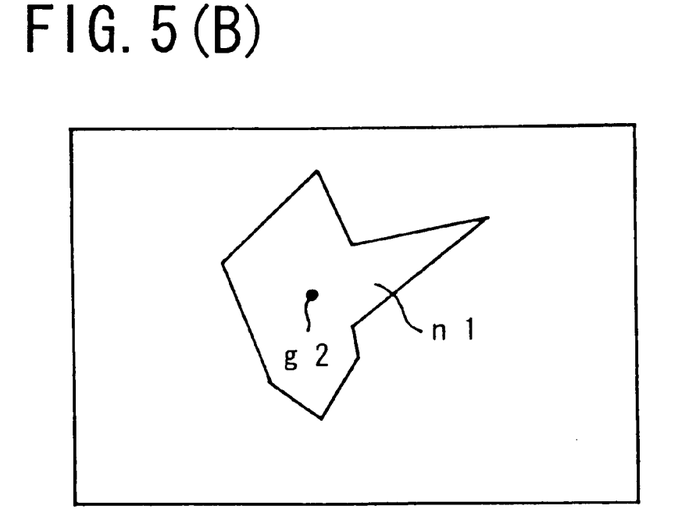
FIG. 5(B) is a diagram which shows the outline image and the center of gravity g2 of a normalized object image n1 in an outline frame image E(x,y,tn+1)
Figure 6A:
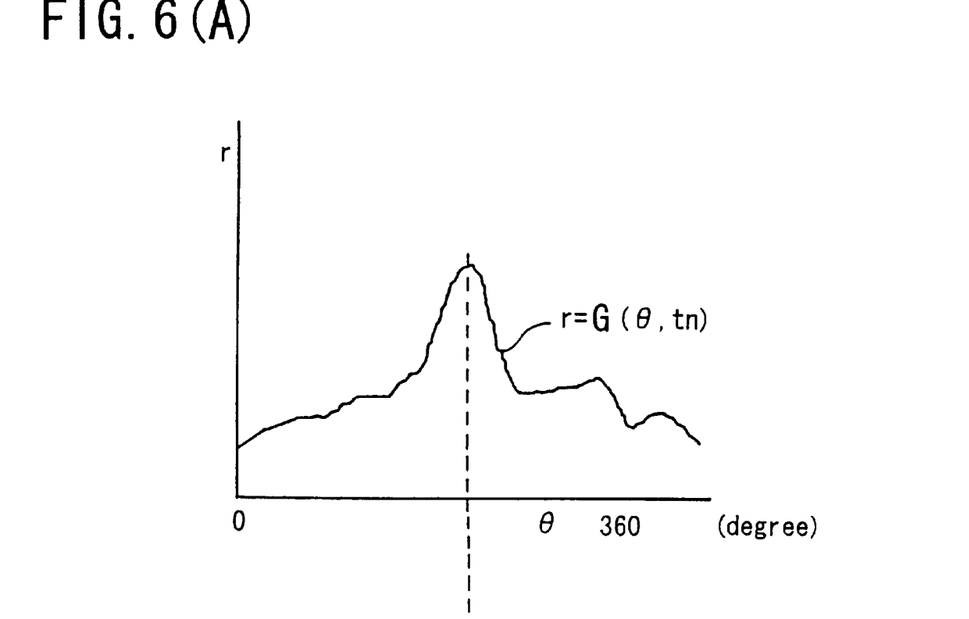
FIG. 6(A) is a plot of distance r versus angle θ of the outline image shown in FIG. 5(A)
Figure 6B:
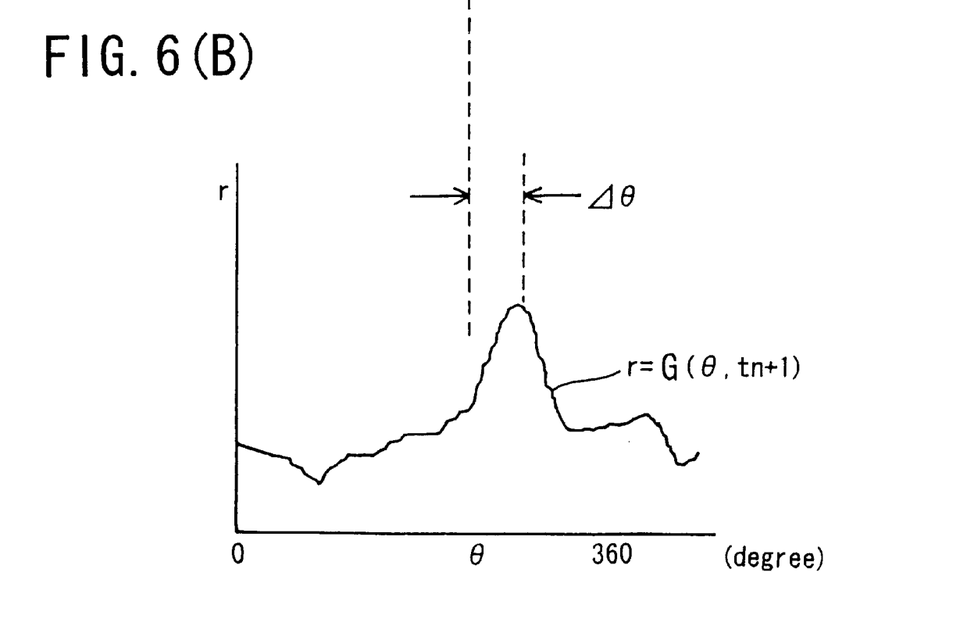
FIG. 6(B) is a plot of distance r versus angle θ of the outline image shown in FIG. 5(B)

FIGS. 5(A), 5(B), 6(A), and 6(B) specifically show how the difference level D(Δθ) is minimized by rotating an object image. More specifically, FIG. 5(A) shows a normalized object image m1 and its center of gravity g1 in an outline frame image E(x,y,tn), while FIG. 5(B) shows the normalized object image n1 and its center of gravity g2 in the next outline frame image E(x,y,tn+1). FIG. 6(A) shows an r–θ plot r=G(θ,tn) of the normalized object image m1 shown in FIG. 5(A). FIG. 6(B) shows an r–θ plot r=G(θ,tn+1) of the object image n1 shown in FIG. 5(B), which clearly teaches that the difference level D(Δθ) is minimized when the r–θ plot is shifted by an angle Δθ. FIGS. 6(A) and 6(B) also indicate that this algorithm can correctly detect rotation angles Δθ up to 180 degrees.

Referring back to FIG. 3, the affine parameter calculation unit 26 calculates the minimum difference level Dmin for every possible combination of moving objects. When trying to find a counterpart of a given object image, the object association decision unit 25 compares the minimum difference levels Dmin with one another for all combinations concerning the given object image. It then extracts the single best combination that exhibits the smallest value of difference level. The object association decision unit 25 determines this extracted combination as an identical object image pair, i.e., a pair of object images that are most likely to represent the same moving object. In the above example, the object image m1 in the first outline frame image E(x,y,tn) and the other object image n1 in the second outline frame image E(x,y,tn+1) are recognized as representing the same moving object. In the same way, the object association decision unit 25 identifies the remaining object images and their respective counterparts, if any.

Referring again to FIG. 3, the affine parameter calculation unit 26 calculates affine parameters with respect to each of the object image pairs identified in the above-described process, and sends them to the predictive affine parameter calculation unit 27. The affine parameters include parallel displacement values A and B, scaling factor C, and rotation angle Δθ. Recall that all those parameters appear in Equation (1).

When a specific object image pair is given, the parallel displacement values A and B are obtained by calculating X-axis and Y-axis distances between the centers of gravity of the two object images. The scaling factor C is obtained as a ratio of two scaling factors (i.e., expansion ratio or shrinking ratio) that were used when normalizing two object images identified as an identical object image pair. The rotation angle Δθ is obtained as an angle of rotation about the center of gravity concerning the identical object image pair.

Based on the parallel displacement values A and B, scaling factor C, and rotation angle Δθ supplied from the affine parameter calculation unit 26, the predictive affine parameter calculation unit 27 calculates another set of affine parameters at a given intermediate time (tn+t) between the two time points (tn) and (tn+1), where tn<tn+t<tn+1. The following equations (7a) to (7d) provides such affine parameters including scaling factor Cp, rotation angle θp, and parallel displacement values Ap and Bp.

$$Cp = C*t/T \quad (7a)$$

$$\theta p = \Delta\theta * t/T \quad (7b)$$

$$Ap = A*t/T \quad (7c)$$

$$Bp = B*t/T \quad (7d)$$

where T is an interval (tn+1−tn) between the time points (tn) and (tn+1). The predictive affine parameter calculation unit 27 performs the above process for each moving object, and sends the resultant parameters to a predictive object image generation unit 29.

On the other hand, a background image generator 28 creates a background image by removing images of moving objects from a source picture, based on the frame images at time points (tn) and (tn+1) retrieved from the frame memory 21 and object images received from the object association decision unit 25. Referring next to FIGS. 7(A) to 7(E), the following section will focus on the method to produce a background image.

Figure 7A:
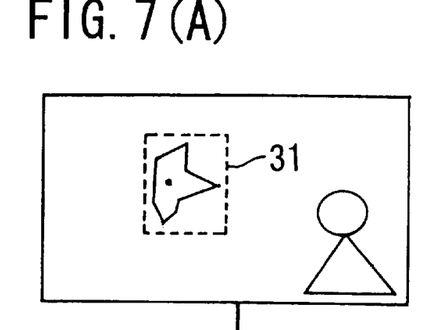
FIG. 7(A) is a diagram which shows a frame image captured at time point (tn)
Figure 7B:
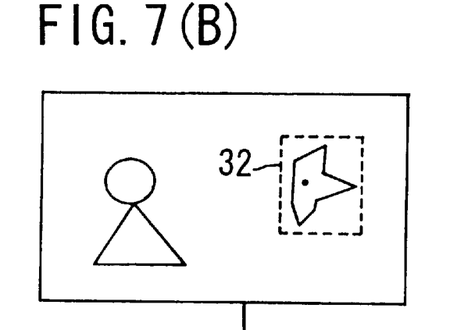
FIG. 7(B) is a diagram which shows a frame image captured at time point (tn+1)
Figure 7C:
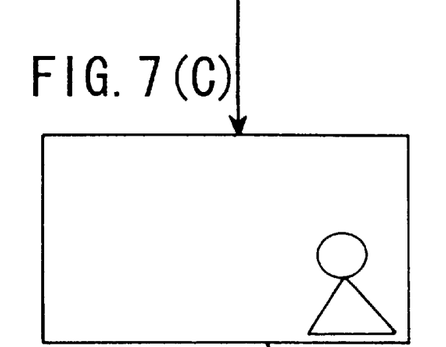
FIG. 7(C) is a diagram which shows a frame image obtained by removing a rectangular area circumscribing a moving object from the frame image captured at time point (tn)
Figure 7D:
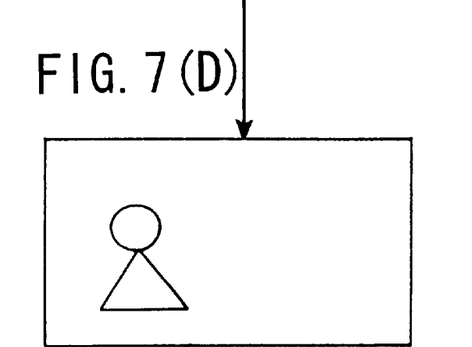
FIG. 7(D) is a diagram which shows a frame image obtained by removing a rectangular area circumscribing a moving object from the frame image captured at time point (tn+1)
Figure 7E:
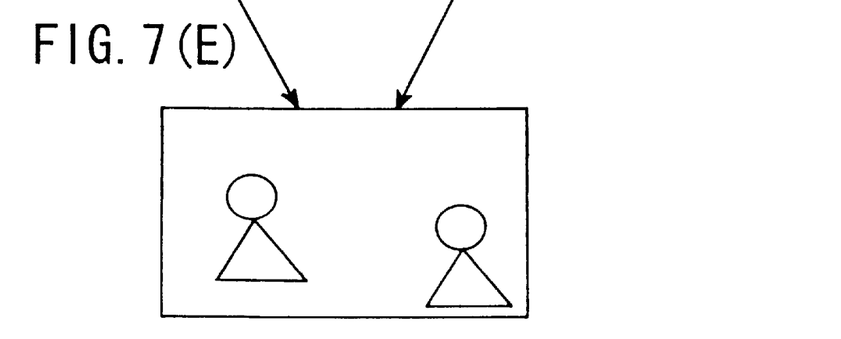
FIG. 7(E) is a diagram which shows a background image obtained by overlaying the frame images of FIG. 7(C) and FIG. 7(D)

FIGS. 7(A) to 7(E) show how the background image generator 28 creates a background image. FIG. 7(A) is a frame image at time point (tn), while FIG. 7(B) is another frame image at time point (tn+1). When there is such an object that appears both in the first frame image at time point (tn) and the second frame image at time point (tn+1), the background image generator 28 removes a circumscribing rectangular area 31 from the first frame image at time point (tn) and another circumscribing rectangular area 32 from the second frame image at time point (tn+1). This results in frame images of FIGS. 7(C) and 7(D), and a background image of FIG. 7(E) is obtained by combining those two frame images. The above process is applied to all moving object images that have been detected.

Referring back to FIG. 3, the predictive object image generation unit 29 receives the background image from the background image generator 28, and also a frame image at time point (tn) from the frame memory 21. With the affine parameters at time point (tn+t) supplied from the predictive affine parameter calculation unit 27, the predictive object image generation unit 29 applies an affine transformation to each moving object included in the frame image at time point (tn). More specifically, each pixel value P(X,Y,t) of an object image in the frame at time point (tn+t) is calculated on the basis of the following equation (8).

$$\begin{pmatrix} X \\ Y \end{pmatrix} = Cp \begin{pmatrix} \cos\theta p & -\sin\theta p \\ \sin\theta p & \cos\theta p \end{pmatrix} \begin{pmatrix} x \\ y \end{pmatrix} + \begin{pmatrix} Ap \\ Bp \end{pmatrix}, \quad (8)$$

where Cp is scaling factor, θp is rotation angle, and Ap and Bp are parallel displacement values in the X- and Y-axis directions.

The predictive object image generation unit 29 overwrites the resultant image of the moving object at time point (tn+t) on the background image.

The predictive object image generation unit 29 executes the above process for every moving object, thereby yielding another complete frame image where all object images at time point (tn+t) are overwritten to the background image. This new frame image is sent to a frame insertion unit 30 as the frame image at time point (tn+t).

In the above explanation, the predictive object image generation unit 29 applied an affine transformation to object images contained in the frame image at time point (tn). As an alternate configuration, it is also possible to configure the same unit so that the affine transformation is applied to object images contained in the frame image at time point (tn+1).

The frame insertion unit 30 receives frame images at time points (tn) and (tn+1) from the frame memory 21, as well as accepting the frame image at time point (tn+t) from the predictive object image generation unit 29. In addition, the frame insertion unit 30 receives frame-drop indication from the video decoder 13 (FIG. 2), which indicates which frame was dropped at the sending end. According to this information, the frame insertion unit 30 inserts the frame image at time point (tn+t) between the frames at time points (tn) and (tn+1). When the frame-drop indication shows that no frame subsampling operations was performed, the insertion of the frame is disabled. In the way described above, the dropped frames are restored at the receiving end by using the frame interpolation techniques.

Figure 8A:
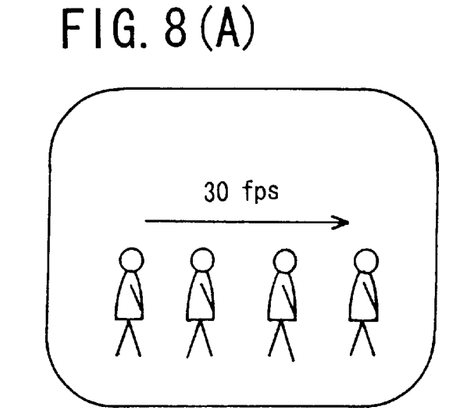
FIG. 8(A) is a diagram which illustrates an object motion in source frame images captured at a rate of 30 frames per second.
Figure 8B:
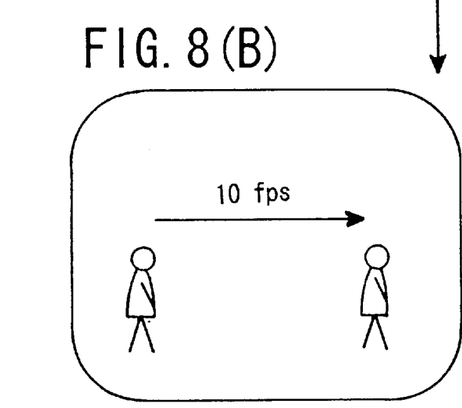
FIG. 8(B) is a diagram which shows an object motion reproduced from video data transmitted over a telecommunication line, where the frames are subsampled in order to reduce the rate to 10 frames per second.
Figure 8C:
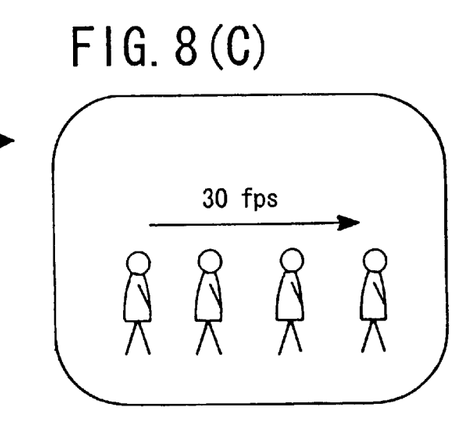
FIG. 8(C) is a diagram which shows an object motion reproduced through a frame interpolation process.

FIG. 8(A) is a diagram which illustrates an object motion in source frame images captured at a rate of 30 fps. This view shows a person walking from left to right. These source images are, however, subsampled drastically so as to reduce the frame rate to 10 fps, and such video data is transmitted over the communications channel. FIG. 8(B) shows an object motion reproduced simply from the video data with frame drops. The present invention, however, employs frame interpolation techniques to reproduce the original object motion from the same subsampled video data. FIG. 8(C) depicts the result of the frame interpolation.

In the embodiment explained above, the outline detection unit 1 shown in FIG. 1 corresponds to the moving outline extraction unit 22 in FIG. 3. Similarly, the affine parameter calculation unit 2 is implemented as a combination of the first and second outline image storage units 23 and 24, object association decision unit 25, and affine parameter calculation unit 26. The affine parameter interpolation unit 3 serves as the predictive affine parameter calculation unit 27. The interpolated image generation unit 4 corresponds to the background image generator 28 and predictive object image generation unit 29.

The above discussion is summarized as follows. The present invention comprises an outline detection unit and affine parameter calculation unit to obtain the outlines of moving objects contained in each source frame image and to calculate affine parameters from the geometrical relationships between the obtained outline images. The calculation of such outlines and affine parameters requires a far smaller amount of computation power compared to conventional calculation methods which calculate affine parameters from moment axes. The reduction in computation loads makes it possible to process the video images on the fly, and thus the image processor of the present invention can serve for real-time applications such as videoconferencing systems.

Moreover, since the present invention calculates affine parameters from geometrical relation between outlines of a moving object, the rotation angle can be determined up to 180 degrees correctly. That is, the range of detectable rotation angles is expanded two times as wide as that in the conventional moment-axis-based methods.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. An image processing apparatus with interframe interpolation capabilities for reproducing video frames by performing frame interpolation between given video frame images, comprising:

(a) outline detection means for calculating interframe difference values and intraframe difference values with respect to a plurality of video frame images supplied in a time sequence, and detecting outlines of object images based on the interframe difference values and the intraframe difference values, said plurality of video frame images including a first frame image at a first point in time and a second frame image at a second point in time, said first frame image containing a first object image, said second frame image containing a second object image, said outlines including a first outline of the first object image and a second outline of the second object image;

(b) affine parameters calculation means for calculating first affine parameters that represent a geometric transformation between the first outline and the second outline which are detected by said outline detection means;

(c) affine parameter interpolation means for producing second affine parameters corresponding to a third point in time between the first point in time and the second point in time, by performing a linear interpolation with respect to the first affine parameters calculated by said affine parameter calculation means; and (d) interpolated image generating means for generating an image of a moving object at the third point in time by applying an affine transformation to the first object image at the first point in time or to the second object image at the second point in time, with the second affine parameters corresponding to the third point in time.

2. The image processing apparatus according to claim 1, wherein said outline detection means adds the calculated intraframe difference values and the calculated interframe difference values to obtain total difference values on an individual pixel basis, and recognizes such a set of pixels that exhibit the total difference values larger than a predetermined threshold as the outline of the object image.

3. The image processing apparatus according to claim 1, wherein said affine parameter calculation means comprises (b1) center-of-gravity calculation means for calculating a first center of gravity of the first outline and a second center of gravity of the second outline, based on the outlines of object images detected in each video frame image by said outline detection means, (b2) distance calculation means for calculating first distances between the first center of gravity and points on the first outline and second distances between the second center of gravity and points on the second outline, and (b3) affine parameter determining means for obtaining parallel displacement by calculating a distance between the first center of gravity and the second center of gravity calculated by said center-of-gravity calculation means, calculating a rotation angle and a scaling factor from the first distances and the second distances calculated by said distance calculation means, and providing the parallel displacement, the rotation angle, and the scaling factor as the first affine parameters.

4. The image processing apparatus according to claim 3, wherein said affine parameters calculation means further comprises (b4) multiple moving object detection means for detecting presence of a plurality of object images in each video frame image by examining the outlines of object images detected in each video frame image by said outline detection means, said plurality of object images including a first group of object images at the first point in time and a second group of object images at the second point in time;

(b5) distance difference calculation means for producing a plurality of object image pairs by combining the first object image with other object images each selected as the second object image from among the second group of object images contained in the second frame image, and investigating difference between two object images constituting each object image pair by evaluating the first and second distances calculated by said distance calculation means, and (b6) searching means for finding a particular object image pair that exhibits the smallest difference among the plurality of object image pairs produced by said distance difference calculation means, and said affine parameters calculation means makes said affine parameter determining means provide the first affine parameters concerning the object images contained in the particular object image pair found by said searching means.

5. The image processing apparatus according to claim 1, which is disposed in a video reception section of a videoconferencing terminal.

* * * * *